US012068694B2

(12) United States Patent
Endo et al.

(10) Patent No.: US 12,068,694 B2
(45) Date of Patent: Aug. 20, 2024

(54) INTEGRATED CIRCUIT AND POWER SUPPLY DEVICE

(71) Applicant: FUJI ELECTRIC CO., LTD., Kawasaki (JP)

(72) Inventors: Yuta Endo, Matsumoto (JP); Takato Sugawara, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 212 days.

(21) Appl. No.: 17/703,712

(22) Filed: Mar. 24, 2022

(65) Prior Publication Data

US 2022/0216797 A1    Jul. 7, 2022

Related U.S. Application Data

(63) Continuation of application No. PCT/JP2021/008510, filed on Mar. 4, 2021.

(30) Foreign Application Priority Data

Apr. 15, 2020 (JP) ................................. 2020-072964

(51) Int. Cl.
  *H02M 3/335*  (2006.01)
  *H02M 1/08*  (2006.01)
  *H02M 1/42*  (2007.01)

(52) U.S. Cl.
  CPC ......... *H02M 3/33571* (2021.05); *H02M 1/08* (2013.01); *H02M 1/4208* (2013.01)

(58) Field of Classification Search
  CPC .. H02M 3/33571; H02M 1/08; H02M 1/4208; H02M 1/0032
  See application file for complete search history.

(56) References Cited

U.S. PATENT DOCUMENTS

| 10,910,954 B1* | 2/2021 | Shah ...................... H01R 24/60 |
| 2011/0175587 A1 | 7/2011 | Hosotani |
| 2012/0175958 A1 | 7/2012 | Dighrasker et al. |
| 2013/0170265 A1* | 7/2013 | Iwabuki .................. H02M 7/06 |
| | | 363/126 |

FOREIGN PATENT DOCUMENTS

| JP | 2011-071885 A | 4/2011 |
| JP | 2011-147315 A | 7/2011 |
| JP | 2017-060329 A | 3/2017 |
| JP | WO2015/050093 A1 | 3/2017 |

OTHER PUBLICATIONS

International Search Report for PCT/JP2021/008510, mailed on Apr. 27, 2021.

* cited by examiner

*Primary Examiner* — Adolf D Berhane
*Assistant Examiner* — Afework S Demisse
(74) *Attorney, Agent, or Firm* — Rabin & Berdo, P.C.

(57) ABSTRACT

An integrated circuit for a power supply circuit that includes a transistor and generates an output voltage of a target level. The integrated circuit is configured to switch the transistor. The integrated circuit includes a first terminal configured to receive a feedback voltage according to the output voltage, a signal detection circuit configured to detect, through the first terminal, a setting signal received from an external circuit that operates based on the output voltage, and a driver circuit configured to drive the transistor in response to the setting signal detected by the signal detection circuit.

9 Claims, 11 Drawing Sheets

| | PULSE WIDTH | Q1 (C1) | Q2 (C2) | Q3 (C3) | S1 | S2 | Vc2 | Vsb | MODE |
|---|---|---|---|---|---|---|---|---|---|
| A | T1 | L | L | L | H | L | – | H | STOP |
| B | T2 | H | L | L | L | L | – | L | CONTINUOUS |
| C | T3 | H | H | L | L | H | H | H | BURST |
| | | | | | | | L | L | |
| D | T4 | H | H | H | L | L | – | L | SHORT-CIRCUIT |

FIG. 8

INTEGRATED CIRCUIT AND POWER SUPPLY DEVICE

CROSS-REFERENCE TO RELATED APPLICATIONS

This is a continuation application of International Patent Application No. PCT/JP2021/008510 filed Mar. 4, 2021, which claims the benefit of priority to Japanese Patent Application No. 2020-072964 filed Apr. 15, 2020, the entire contents of each of which the entire contents of each of which are incorporated herein by reference.

BACKGROUND

Technical Field

The present disclosure relates to an integrated circuit and a power supply device.

Description of the Related Art

There are switching control circuits that control switching of transistors of power supply circuits (for example, International Publication No. 2015/050093).

Meanwhile, there is a switching control circuit that communicates with an external circuit using a dedicated terminal, thereby controlling switching of a transistor to cooperate with the external circuit.

However, because of a reduction in size and a multi-functionalization, a terminal used for a purpose other than communications is needed, which makes it difficult to arrange a terminal dedicated to communications to establish such a cooperation.

SUMMARY

A first aspect of an embodiment of the present disclosure is an integrated circuit for a power supply circuit that includes a transistor and generates an output voltage of a target level, the integrated circuit being configured to switch the transistor, the integrated circuit comprising: a first terminal configured to receive a voltage according to the output voltage; a signal detection circuit configured to detect, through the first terminal, a setting signal received from an external circuit that operates based on the output voltage; and a driver circuit configured to drive the transistor in response to the setting signal detected by the signal detection circuit.

A second aspect of an embodiment of the present disclosure is a power supply device comprising: a first integrated circuit configured to switch a transistor of a power supply circuit such that the power supply circuit generates an output voltage of a target level; and a second integrated circuit configured to operate based on the output voltage, the second integrated circuit including a setting-signal output circuit configured to output a setting signal to the first integrated circuit, and the first integrated circuit including: a first terminal configured to receive a feedback voltage according to the output voltage; a signal detection circuit configured to detect, through the first terminal, the setting signal outputted from the second integrated circuit; and a driver circuit configured to drive the transistor in response to the setting signal detected by the signal detection circuit.

BRIEF DESCRIPTION OF THE DRAWINGS

FIG. 8 is a diagram illustrating a correspondence relationship between pulse widths of a setting signal Sig and a logic level of each node in a detection circuit 131.

DETAILED DESCRIPTION

At least following matters will become apparent from descriptions of the present specification and the accompanying drawings.

EMBODIMENT

Overview of Power Supply Device 10

Figure 1:
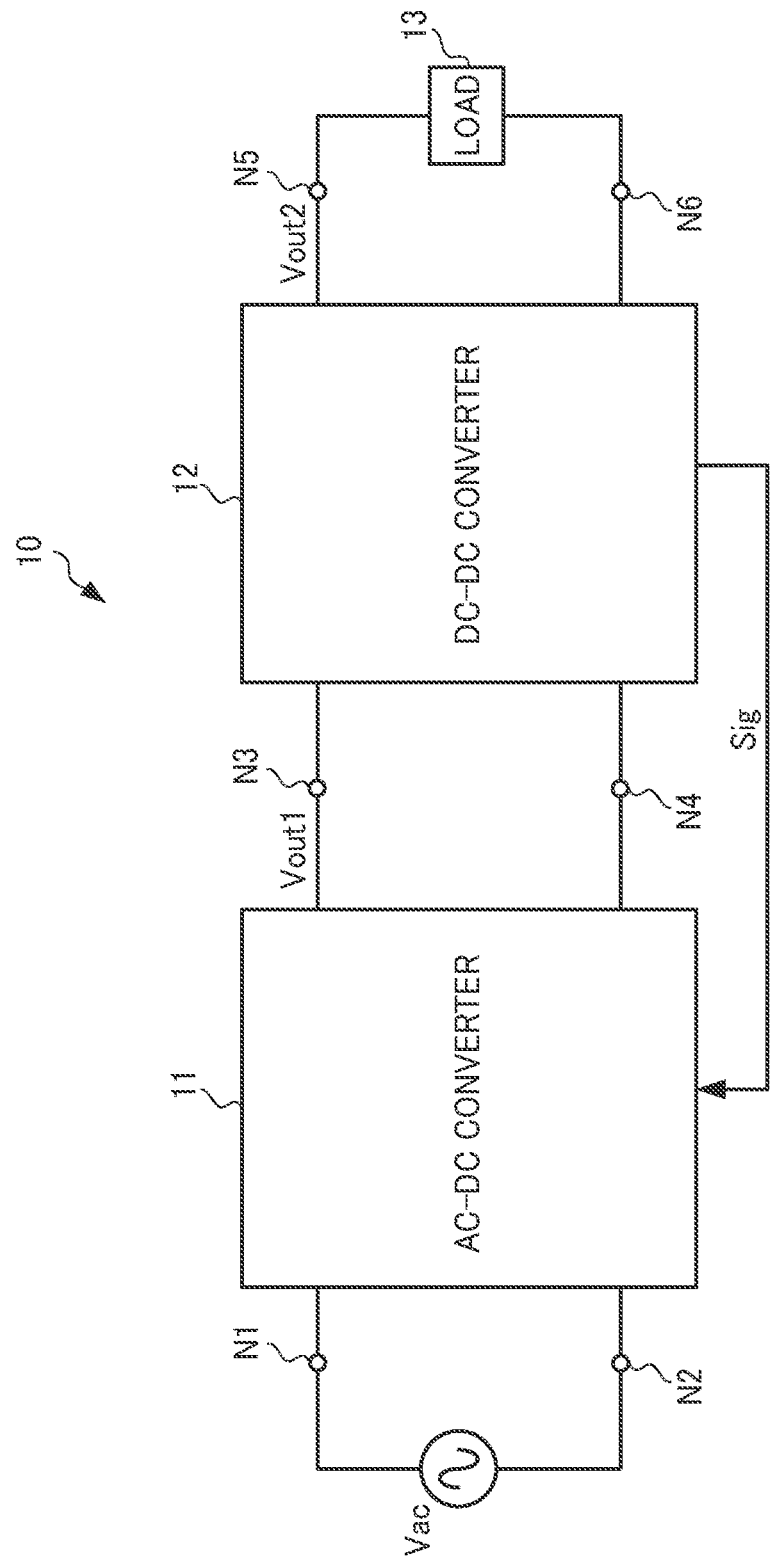
FIG. 1 is a diagram illustrating an example of a power supply device 10.

FIG. 1 is a diagram illustrating an example of a power supply device 10. The power supply device 10 includes an AC-DC converter 11, a DC-DC converter 12, and a load 13. The AC-DC converter 11 generates an output voltage Vout1 from an alternating-current (AC) voltage Vac applied to nodes N1, N2. The DC-DC converter 12 generates an output voltage Vout2 from the output voltage Vout1 applied to nodes N3, N4. The load 13 is coupled to nodes N5, N6 and the output voltage Vout2 is applied to the load 13. The load 13 is, for example, an electronic device that operates using a direct-current (DC) voltage. In addition, a setting signal Sig is communicated from the DC-DC converter 12 to the AC-DC converter 11.

Overview of DC-DC Converter 12

Figure 2:
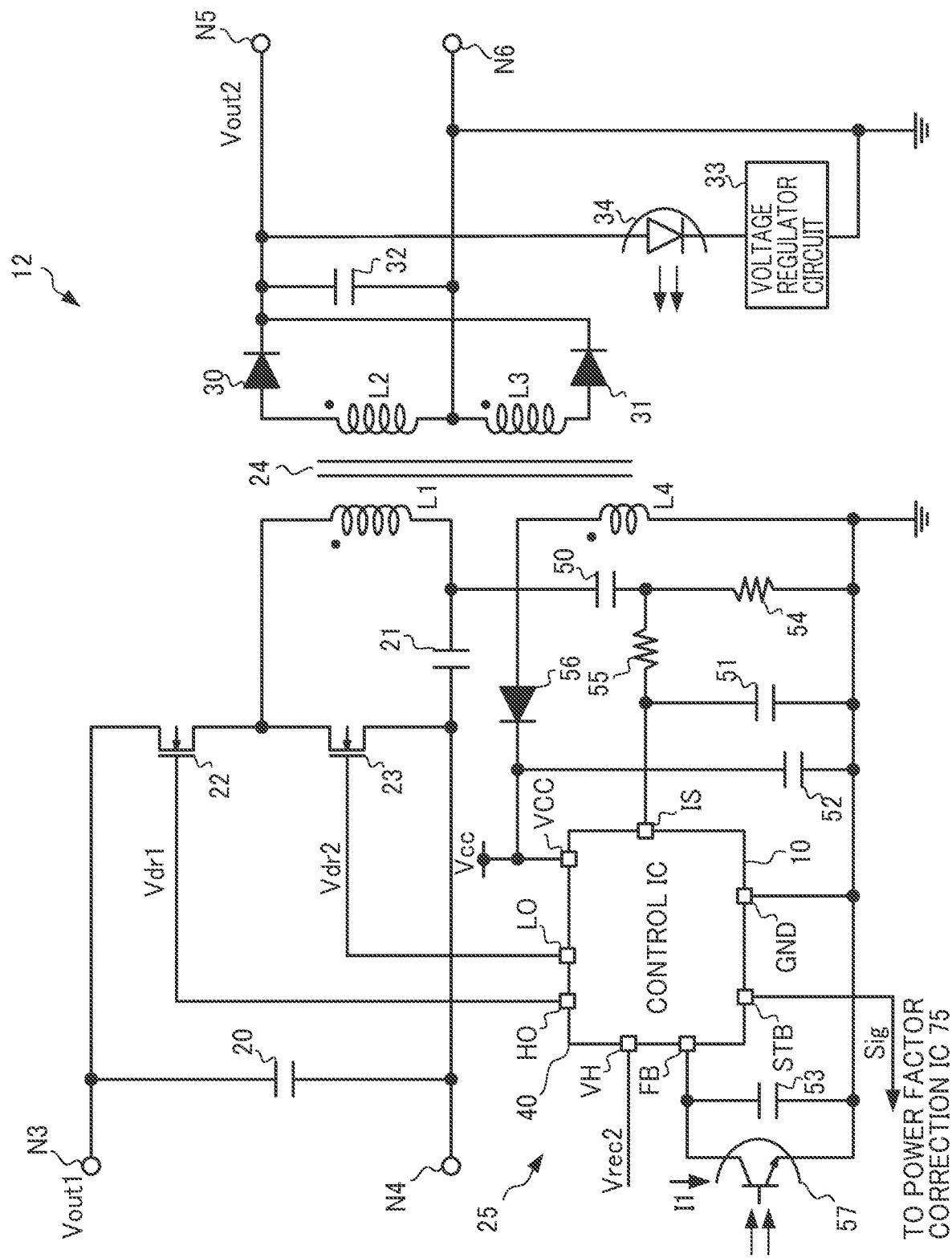
FIG. 2 is a diagram illustrating an example of a DC-DC converter 12.

FIG. 2 is a diagram illustrating a configuration of the DC-DC converter 12 included in the power supply device 10 according to an embodiment of the present disclosure. The DC-DC converter 12 is an LLC current-resonant converter that generates the output voltage Vout2 of a target level at the load 13 from a predetermined input voltage Vout1.

The DC-DC converter 12 includes capacitors 20, 21, 32, N-channel Metal-Oxide-Semiconductor (NMOS) transistors 22, 23, a transformer 24, a control block 25, diodes 30, 31, a voltage regulator circuit 33, and a light-emitting diode 34.

The capacitor 20 stabilizes a voltage between a power supply line which receives the input voltage Vout1 and a ground line on the ground side, to remove noise and the like. Note that the input voltage Vout1 is a DC voltage of a predetermined level.

The NMOS transistor 22 is a high-side power transistor, and the NMOS transistor 23 is a low-side power transistor. Note that the NMOS transistors 22, 23 are used as switching devices in an embodiment of the present disclosure, however, for example, P-channel Metal-Oxide-Semiconductor (PMOS) transistors or bipolar transistors may be used instead.

The transformer 24 includes a primary coil L1, secondary coils L2, L3, and an auxiliary coil L4. The primary coil L1, the secondary coils L2, L3, and the auxiliary coil L4 are insulated from one another. In the transformer 24, a voltage is generated in the secondary coils L2, L3 on the secondary side according to a variation in voltage across the primary coil L1 on the primary side, and a voltage is generated in the auxiliary coil L4 on the primary side according to a variation in voltage in the secondary coils L2, L3.

In addition, the primary coil L1 has one end coupled to the source of the NMOS transistor 22 and the drain of the NMOS transistor 23, and the other end coupled to the source of the NMOS transistor 23 through the capacitor 21.

Accordingly, in response to start of switching of the NMOS transistors 22, 23, the voltage in each of the secondary coils L2, L3 and the auxiliary coil L4 changes. Note that the primary coil L1 and the secondary coils L2, L3 are electromagnetically coupled with the same polarity, and the secondary coils L2, L3 and the auxiliary coil L4 are also electromagnetically coupled with the same polarity.

The control block 25 is a circuit block for controlling switching of the NMOS transistors 22, 23, and will be described later in detail.

The diodes 30, 31 rectify the voltages in the secondary coils L2, L3, and the capacitor 32 smooths the rectified voltages. As a result, a smoothed output voltage Vout2 is generated in the capacitor 32. Note that the output voltage Vout2 results in the DC voltage of the target level.

The voltage regulator circuit 33 generates a constant DC voltage, and is configured using a shunt regulator, for example.

The light-emitting diode 34 emits light having an intensity according to a difference between the output voltage Vout2 and the output of the voltage regulator circuit 33, and configures a photocoupler together with a phototransistor 57 which will be described later. In an embodiment of the present disclosure, as the level of the output voltage Vout2 rises, the intensity of the light emitted from the light-emitting diode 34 increases.

Control Block 25

The control block 25 includes a control IC 40, capacitors 50 to 53, resistors 54, 55, a diode 56, and the phototransistor 57.

The control IC 40 is an integrated circuit that controls switching of the NMOS transistors 22, 23, and has terminals VCC, GND, STB, FB, IS, HO, LO, VH.

The terminal VCC is a terminal to receive a voltage Vcc for operating the control IC 40. The terminal VCC is coupled to a capacitor 52 having one end grounded and the cathode of the diode 56. Hence, the capacitor 52 is charged with a current from the diode 56, and the charge voltage of the capacitor 52 results in the voltage Vcc for operating the control IC 40.

The terminal GND is a terminal to receive a ground voltage, and is coupled to, for example, the body or the like of an apparatus where the power supply device 10 is provided.

The terminal STB is a terminal from which a setting signal Sig for cooperating with a power factor correction IC 75 (described later) that controls the AC-DC converter 11 is outputted.

The terminal FB is a terminal at which a feedback voltage Vfb_a according to the output voltage Vout2 is generated, and is coupled to the capacitor 53 and the phototransistor 57. The capacitor 53 is provided to remove noise between the terminal FB and the ground, and the phototransistor 57 passes a bias current I1 having a magnitude according to the intensity of the light from the light-emitting diode 34, from the terminal FB to the ground. Hence, the phototransistor 57 operates as a transistor that generates a sink current.

The terminal IS is a terminal to receive a voltage according to the resonant current of the DC-DC converter 12. Here, at the node at which the capacitor 50 and the resistor 54 are coupled, a voltage according to the current value of the resonant current of the primary coil L1 is generated. And, the resistor 55 and the capacitor 51 configure a low-pass filter. Hence, the terminal IS receives a voltage obtained by removing noise components, according to the current value of the resonant current of the primary coil L1.

Note that the current value of the resonant current increases according to the input power of the DC-DC converter 12, and the input power of the DC-DC converter 12 increases according to the power consumed by the load 13. Hence, the voltage to be applied to the terminal IS represents a voltage according to the power consumption of the load 13.

The terminal VH is a terminal to receive a rectified voltage. Note that the power supply device 10 includes two rectifier circuits that rectify the AC voltage Vac, which will be described later in detail. The first one is a full-wave rectifier circuit 70 (described later) in the AC-DC converter 11 for generating the output voltage Vout1, and the full-wave rectifier circuit 70 outputs a rectified voltage Vrec1. The second one is a rectifier circuit comprising diodes 77, 78 (described later) for generating the voltage Vcc at the start-up of the power supply device 10, and the diodes 77, 78 output a rectified voltage Vrec2.

The terminal VH receives the rectified voltage Vrec2. Note that the control IC 40 includes a start-up circuit 61 that charges the voltage Vcc and starts up the control IC 40 upon receiving rectified voltage Vrec2 through the terminal VH, and operates based on the voltage Vcc after the start-up.

The terminal HO is a terminal from which the driving signal Vrd1 for driving the NMOS transistor 22 is outputted, and is coupled to the gate of the NMOS transistor 22.

The terminal LO is a terminal from which the driving signal Vdr2 for driving the NMOS transistor 23 is outputted, and is coupled to the gate of the NMOS transistor 23.

Details of Control IC 40

Figure 3:
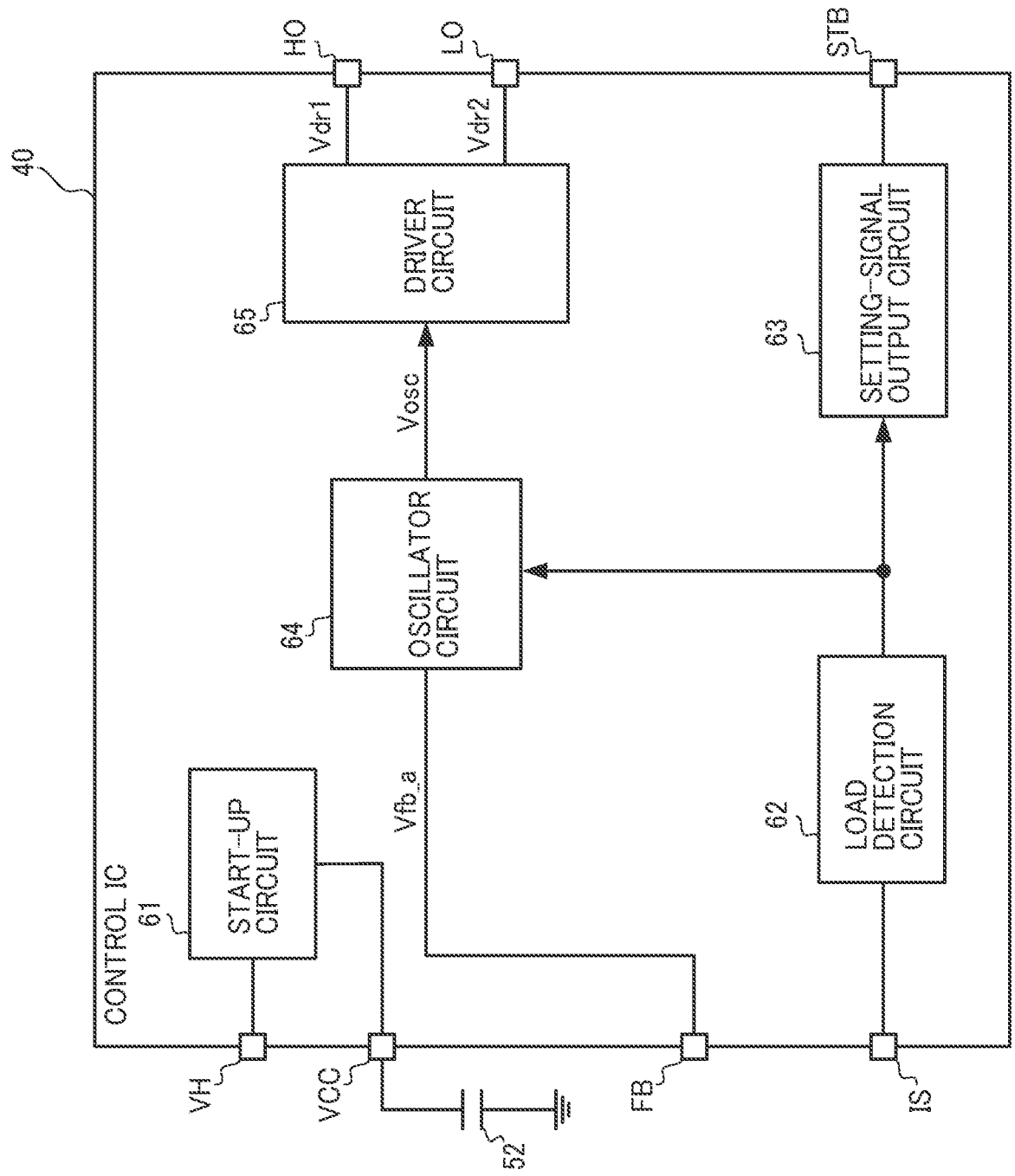
FIG. 3 is a diagram illustrating an example of a control integrated circuit (IC) 40.

FIG. 3 is a diagram illustrating a configuration of the control IC 40. The control IC 40 includes the start-up circuit 61, a load detection circuit 62, a setting-signal output circuit 63, an oscillator circuit 64, and a driver circuit 65. Note that the terminal GND is omitted here.

The start-up circuit 61 charges the capacitor 52, which is provided outside the control IC 40, with the rectified voltage Vrec2 applied through the terminal VH, based on the voltage Vcc at the terminal VCC, and generates the voltage Vcc, at the start-up of the DC-DC converter 12. The start-up circuit 61 is turned on in response to the AC voltage Vac being applied to the power supply device 10 at the start-up, is turned off in response to the voltage Vcc reaching a predetermined level, and is turned on again in response to the voltage Vcc decreasing from the predetermined level by an amount corresponding to a certain level. In addition, when the start-up of the DC-DC converter 12 is finished and the capacitor 52 is sufficiently charged with the current from the auxiliary coil L4, the start-up circuit 61 is turned off.

The term "start-up" herein refers to the operation of the power supply device 10 from when the AC voltage Vac is applied to the power supply device 10 to when the power supply device 10 becomes able to apply the output voltage Vout2 of the predetermined level to the load 13. The "start-up" of the DC-DC converter 12 is considered to be the operations indicating in the following steps (1) and (2). In step (1), in response to the AC voltage Vac being applied to the power supply device 10, the start-up circuit 61 charges the capacitor 52 with the rectified voltage Vrec2 from the terminal VH. In step (2), the voltage Vcc (i.e., the voltage of the capacitor 52) rises to enable an internal circuit of the control IC 40 to operate, the control IC 40 starts driving the NMOS transistors 22, 23, and the DC-DC converter 12 outputs the output voltage Vout2.

The load detection circuit 62 detects whether the load 13 is under heavy load condition or light load condition based on the voltage that is applied to the terminal IS and that is in accordance with the power consumption of the load 13. The load detection circuit 62 outputs a signal indicating the condition of the load 13 to the setting-signal output circuit 63 and the oscillator circuit 64.

Here, the power consumption of the load 13 is larger when the load 13 is under heavy load condition than when the load 13 is under light load condition. Accordingly, the voltage applied to the terminal IS represents the voltage according to the power consumption of the load 13, and thus when the voltage at the terminal IS is lower than a predetermined value, the load 13 is under light load condition, and when the voltage at the terminal IS is higher than the predetermined value, the load 13 is under heavy load condition.

When the voltage Vcc rises to cause a state setting circuit (not illustrated) of the control IC 40 to operate and the setting of the state of the control IC 40 is finished, at the start-up of the power supply device 10, the setting-signal output circuit 63 outputs a continuous pulse having a "pulse width T1". The continuous pulse having the "pulse width T1" is a setting signal for stopping the driving signal Vdr in order to avoid drop in the voltage Vcc caused by outputting the driving signal Vdr of the power factor correction IC 75 (described later). In addition, the setting-signal output circuit 63 also outputs the continuous pulse having the "pulse width T1" in order to stop the power factor correction IC 75 from switching the NMOS transistor 76 when the power supply is in an abnormal state (for example, the load 13 is short-circuited).

In addition, in a case where the signal from the load detection circuit 62 indicates that the load 13 is under heavy load condition, the setting-signal output circuit 63 outputs a pulse having a "pulse width T2" to cause the power factor correction IC 75 to operate in a "continuous mode (described later)". In addition, in a case where the signal from the load detection circuit 62 indicates that the load 13 is under light load condition, the setting-signal output circuit 63 outputs a pulse having a "pulse width T3" to cause the power factor correction IC 75 to operate in a "burst mode (described later)".

Note that, in an embodiment of the present disclosure, the "continuous mode" is, for example, a mode in which the switching is continuously performed without being intermittently stopped, and the "burst mode" is, for example, a mode in which the switching operation is intermittently stopped. In addition, since when the DC-DC converter 12 is operating in the "continuous mode" corresponds to when the DC-DC converter 12 is not operating in the "burst mode", the time when operating in the "continuous mode" corresponding to the time when not operating in the "burst mode". Note that the same applies to the "continuous mode" and the "burst mode" of the AC-DC converter 11.

The oscillator circuit 64 is a voltage-controlled oscillator circuit that outputs an oscillator signal Vosc for switching the NMOS transistors 22, 23 based on the inputted feedback voltage Vfb_a. In addition, when the voltage Vcc reaches a predetermined value or more, the oscillator circuit 64 outputs an oscillator signal Vosc for operating the control IC 40 in the "continuous mode" or the "burst mode", in response to a signal from the load detection circuit 62. Note that when the level of the voltage Vfb_a drops, the oscillator circuit 64 outputs a high-frequency oscillator signal Vosc.

Here, when the load 13 becomes under light load condition, the output voltage Vout2 rises above the target level. Then, for example, the internal input into the voltage regulator circuit 33 configured with a shunt regulator rises to make the output constant, and thus a large amount of current is passed through the transistor inside the shunt regulator, which is not illustrated.

As a result, a large amount of current also flows through the light-emitting diode 34. Then, the phototransistor 57 passes the bias current I1 having a magnitude according to the degree of amplification of the light from the light-emitting diode 34, from the terminal FB to the ground, to thereby drop the feedback voltage Vfb_a.

The driver circuit 65 switches the NMOS transistors 22, 23 at the frequency of the oscillator signal Vosc. Specifically, the driver circuit 65 outputs pulsed driving signals Vrd1, Vdr2 with the frequency of the oscillator signal Vosc and with an essentially constant duty cycle (for example, 50%) to the NMOS transistors 22, 23, respectively. Note that the driver circuit 65 complementarily changes the driving signal Vdr1 and the driving signal Vdr2 while providing a dead time such that the NMOS transistors 22, 23 are not simultaneously on.

Here, during the operation in the "continuous mode", when the level of the output voltage Vout2 rises above the target level, the feedback voltage Vfb_a drops, to thereby raise the frequency of the oscillator signal Vosc. As a result, the output voltage Vout2 of the DC-DC converter 12, which is an LLC current-resonant converter, drops. On the other hand, when the level of the output voltage Vout2 drops below the target level, the feedback voltage Vfb_a rises, to thereby lower the frequency of the oscillator signal Vosc. As a result, the output voltage Vout2 of the DC-DC converter 12 rises. Accordingly, during the operation in the "continuous mode", the DC-DC converter 12 can generate the output voltage Vout2 of the target level.

Note that the control IC 40 corresponds to the "external circuit" or a "second integrated circuit".

Overview of AC-DC Converter 11

Figure 4:
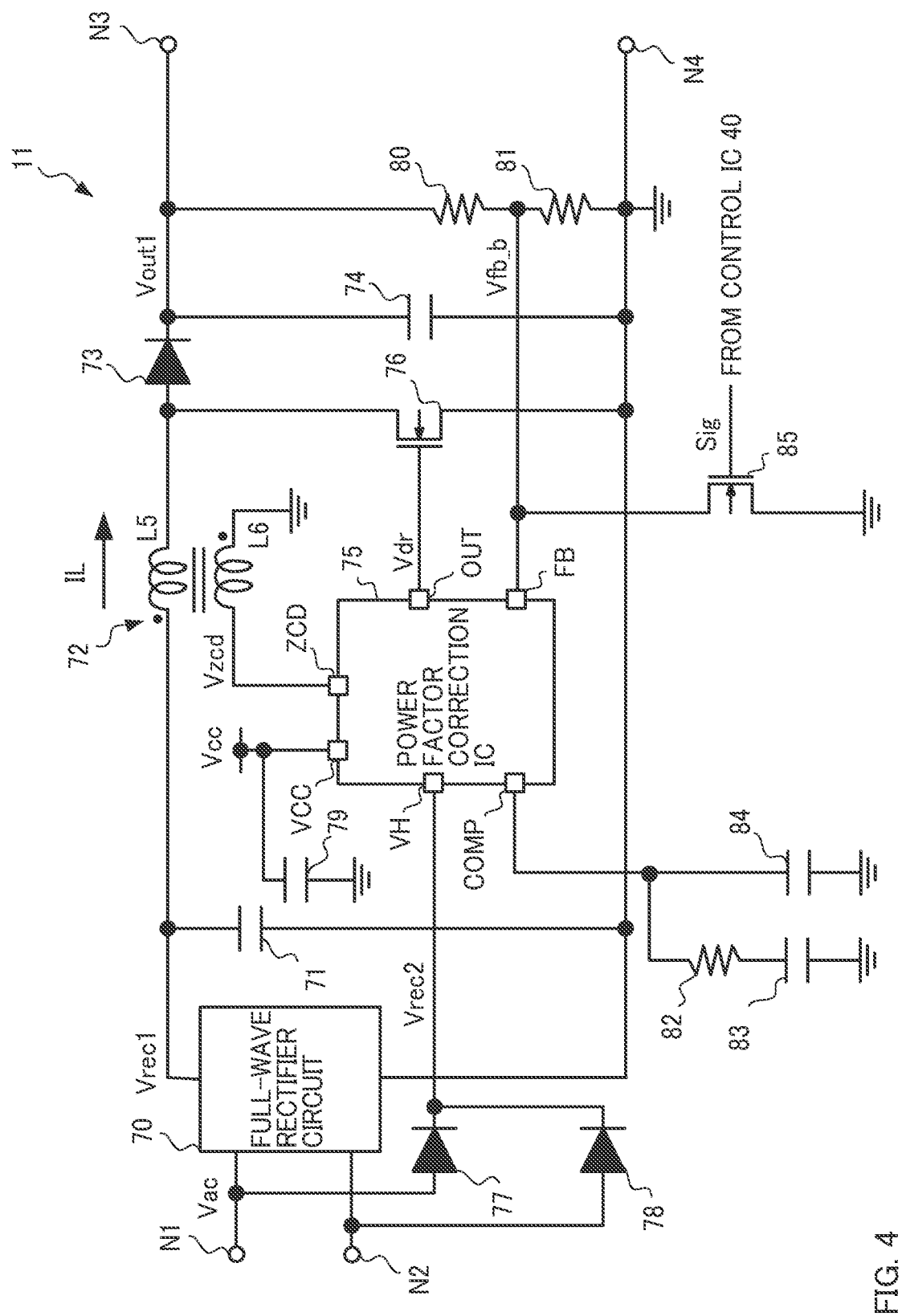
FIG. 4 is a diagram illustrating an example of an AC-DC converter 11.

FIG. 4 is a diagram illustrating a configuration of the AC-DC converter 11. The AC-DC converter 11 is a boost chopper power supply circuit that generates the output voltage Vout1 of the target level from the AC voltage Vac of a commercial power supply.

The AC-DC converter 11 includes a full-wave rectifier circuit 70, capacitors 71, 74, 83, 84, a transformer 72, a diode 73, a power factor correction IC 75, NMOS transistors 76, 85, and resistors 80 to 82.

The full-wave rectifier circuit 70 applies a rectified voltage Vrec1 obtained by full-wave rectifying an applied predetermined AC voltage Vac, to the capacitor 71 and a main coil L5 of the transformer 72. Here, the AC voltage Vac is, for example, a voltage of 100 to 240 V with a frequency of 50 to 60 Hz.

The capacitor 71 is an element that smooths the rectified voltage Vrec1, and the transformer 72 includes the main coil L5 and an auxiliary coil L6 magnetically coupled to the main coil L5. Here, in an embodiment of the present disclosure, the auxiliary coil L6 is formed by winding a wire such that the voltage generated in the auxiliary coil L6 has a polarity opposite to that of the voltage generated in the main coil L5. Then, a voltage Vzcd generated in the auxiliary coil L6 is applied to a terminal ZCD.

Although the rectified voltage Vrec1 is applied directly to the main coil L5, the rectified voltage Vrec1 may be applied to the main coil L5 through an element such as a resistor (not illustrated), for example.

In addition, the main coil L5 configures a boost chopper circuit together with the diode 73, the capacitor 74, and the NMOS transistor 76. Hence, the charge voltage of the capacitor 74 results in being the DC output voltage Vout1. Note that the output voltage Vout1 is, for example, 400 V.

The power factor correction IC 75 is an integrated circuit that controls switching of the NMOS transistor 76 such that the level of the output voltage Vout1 achieves the target level (for example, 400 V) while improving the power factor of the AC-DC converter 11. Specifically, the power factor correction IC 75 drives the NMOS transistor 76 based on an inductor current IL flowing through the main coil L5 and the output voltage Vout1.

Although the details of the power factor correction IC 75 will be described later, the power factor correction IC 75 has terminals VH, VCC, FB, ZCD, COMP, OUT. Note that although the power factor correction IC 75 has terminals other than the foregoing five terminals VH, FB, ZCD, COMP, OUT, such terminals are omitted here for convenience.

The NMOS transistor 76 is a transistor for controlling power of the AC-DC converter 11 to the DC-DC converter 12. It is assumed in an embodiment of the present disclosure that the NMOS transistor 76 is a Metal Oxide Semiconductor (MOS) transistor, but is not limited thereto. The NMOS transistor 76 may be, for example, a bipolar transistor instead, as long as the transistor can control power. In addition, the gate electrode of the NMOS transistor 76 is coupled so as to be driven by a signal from the terminal OUT.

The resistors 80, 81 configure a voltage divider circuit that divides the output voltage Vout1, to generate a feedback voltage Vfb_b that is used when switching the NMOS transistor 76. Note that the feedback voltage Vfb_b generated at the node at which the resistors 80, 81 are coupled is applied to the terminal FB.

Although described later in detail, the resistor 82 and the capacitors 83, 84 are elements for phase compensation of the power factor correction IC 75 configured to be feedback-controlled. The resistor 82 and the capacitor 83 are provided in series between the terminal COMP and the ground, and the capacitor 84 is provided in parallel with the resistor 82 and the capacitor 83.

The NMOS transistor 85 is provided between the terminal FB and the ground, to change the voltage at the terminal FB to the ground voltage during a time period corresponding to the pulse width of the setting signal Sig. Note that the NMOS transistor 85 corresponds to the "switch", and the AC-DC converter 11 corresponds to the "power supply circuit".

Configuration of Power Factor Correction IC 75

Figure 5:
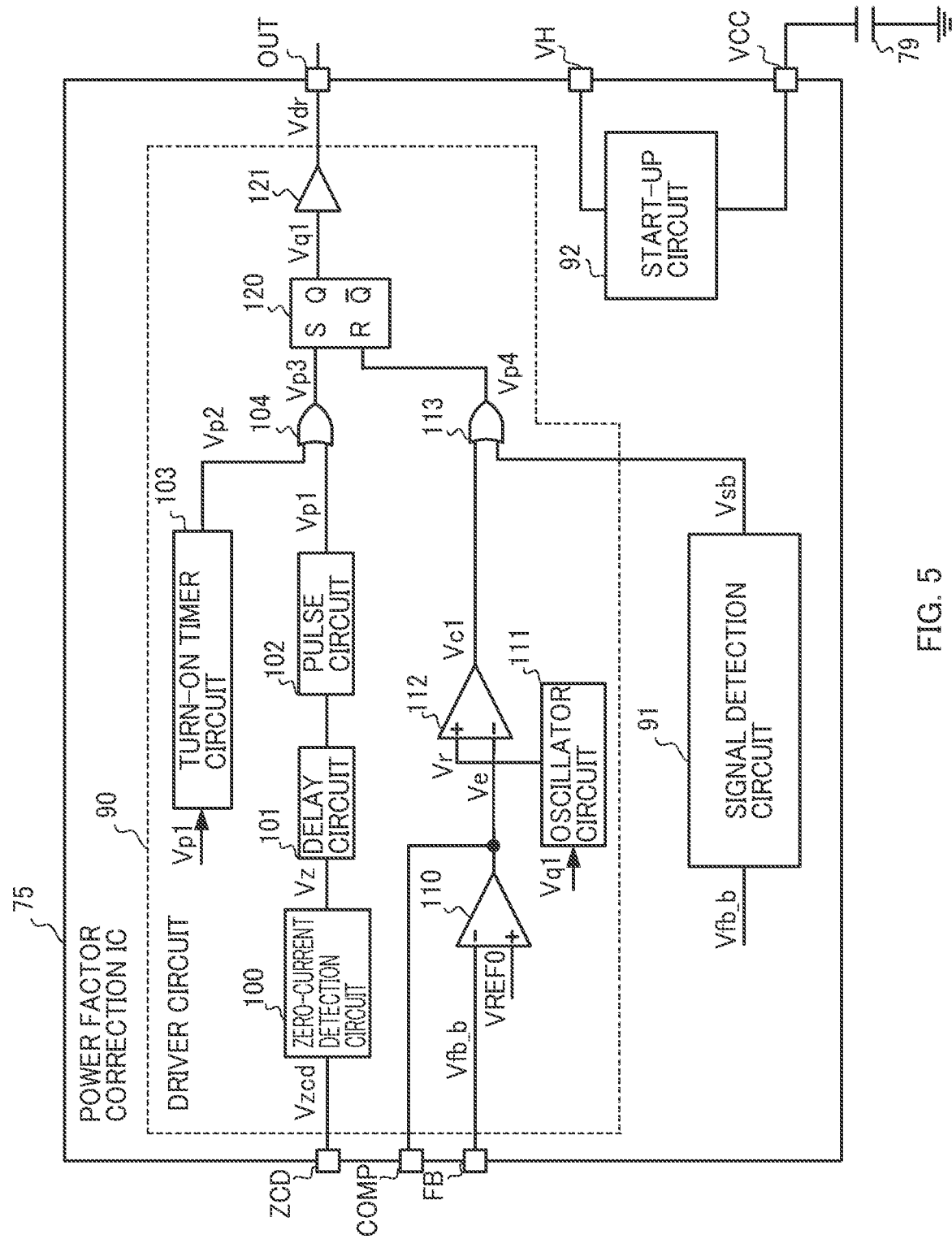
FIG. 5 is a diagram illustrating an example of a power factor correction IC 75.

FIG. 5 is a diagram illustrating an example of the power factor correction IC 75. The power factor correction IC 75 includes a driver circuit 90, a signal detection circuit 91, and a start-up circuit 92. Note that, in FIG. 5, terminals are illustrated at positions different from those in FIG. 4 for convenience, however, wires, devices, and the like coupled to the terminals are the same between FIG. 4 and FIG. 5.

Driver Circuit 90

The driver circuit 90 generates a driving signal Vdr for turning on and off the NMOS transistor 76, based on the feedback voltage Vfb_b according to the output voltage Vout1. The driver circuit 90 includes a zero-current detection circuit 100, a delay circuit 101, a pulse circuit 102, a turn-on timer circuit 103, OR circuits 104, 113, an error amplifier circuit 110, an oscillator circuit 111, a comparator 112, an SR flip-flop 120, and a buffer circuit 121.

The zero-current detection circuit 100 detects whether the current value of the inductor current IL is a "current value Ia" indicating substantially zero (hereinafter, "substantially zero" is simply referred to as zero, for convenience), based on the voltage Vzcd at the terminal ZCD. Note that, in response to detecting that the current value of the inductor current IL is the "current value Ia" of "zero", the zero-current detection circuit 100 according to an embodiment of the present disclosure outputs a signal Vz of a high level (hereinafter referred to as high or high level). In addition, the zero-current detection circuit 100 includes a comparator (not illustrated) that compares the voltage Vzcd and a predetermined voltage of the auxiliary coil L6 at a time when the inductor current IL reaches the "current value Ia".

In response to the high signal Vz being outputted from the zero-current detection circuit 100, the delay circuit 101 delays the signal Vz by a predetermined time period, and outputs the delayed signal Vz.

In response to the high signal Vz being outputted from the delay circuit 101, the pulse circuit 102 outputs a high pulse signal Vp1.

The turn-on timer circuit 103 outputs a pulse signal Vp2 for turning on the NMOS transistor 76, when the power factor correction IC 75 is started or when the AC voltage Vac is interrupted and the pulse signal Vp1 is not outputted. Specifically, the turn-on timer circuit 103 outputs the high pulse signal Vp2 every predetermined cycle when the pulse signal Vp1 is not outputted for a predetermined time period.

The OR circuit 104 calculates and outputs a logical OR of the pulse signals Vp1 and Vp2. Hence, in an embodiment of the present disclosure, the pulse signal Vp1 or the pulse signal Vp2 is outputted from the OR circuit 104 as a signal Vp3.

The error amplifier circuit 110 is amplifies an error between the feedback voltage Vfb_b applied to the terminal FB and a predetermined reference voltage VREF0. Note that the ratio between the resistors 80 and 81 is adjusted based on the reference voltage VREF0 such that the output voltage Vout1 achieves a desired voltage. In addition, the resistor 82 and the capacitors 83, 84 for phase compensation are coupled through the terminal COMP between the output of the error amplifier circuit 110 and the ground. Here the voltage at the node at which the output of the error amplifier circuit 110 and the terminal COMP are coupled is referred to as voltage Ve.

The oscillator circuit 111 outputs a ramp wave Vr having an amplitude that gradually increases every time the high signal Vq1 is received from the SR flip-flop 120.

The comparator 112 compares the magnitudes between the voltage Ve and the ramp wave Vr, and outputs the result of comparison as a signal Vc1. Here, the voltage Ve is applied to the inverting input terminal of the comparator 112, and the ramp wave Vr is applied to the non-inverting input terminal of the comparator 112. Hence, when the level of the ramp wave Vr is lower than the level of the voltage Ve, the signal Vc1 becomes low level (hereinafter referred to as low or low level), and in response to the level of the ramp wave Vr rises higher than the level of the voltage Ve, the signal Vc1 goes high.

The OR circuit 113 calculates and outputs a logical OR of the signal Vc1 and a signal Vsb from the signal detection circuit 91. Hence, when the signal Vc1 or the signal Vsb goes high, a high signal Vp4 is outputted from the OR circuit 113.

The signal Vp3 is inputted to the S input of the SR flip-flop 120, and the signal Vp4 is inputted to the R input of the SR flip-flop 120. Hence, when the signal Vp3 goes high, a driving signal Vq1, which is the Q output of the SR flip-flop 120, goes high. On the other hand, when the signal Vp4 goes high, the driving signal Vq1 goes low. Note that the SR flip-flop 120 operates with reset priority, and outputs the low signal Vq1 without fail when the signal Vp4 is high regardless of the signal Vp3.

The buffer circuit 121 drives the NMOS transistor 76 in response to the driving signal Vq1. Specifically, the buffer circuit 121 drives the NMOS transistor 76 having a large gate capacitance and/or the like, using a signal Vdr having the same logic level as that of the received signal. In addition, the buffer circuit 121 turns on the NMOS transistor 76 in response to the high driving signal Vq1, and turns off the NMOS transistor 76 in response to the low driving signal Vq1.

Signal Detection Circuit 91

Figure 6:
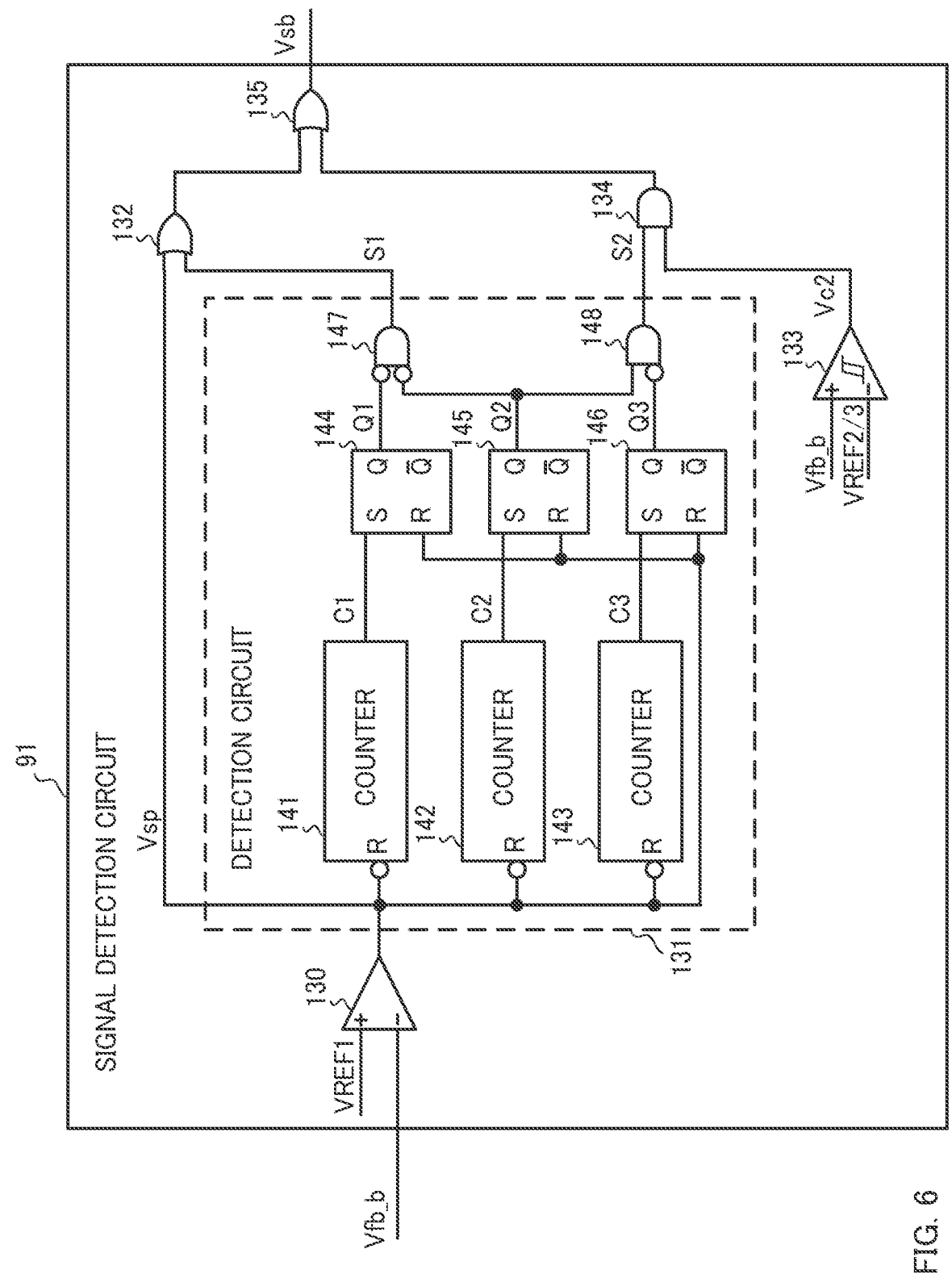
FIG. 6 is a diagram illustrating an example of a signal detection circuit 91.

FIG. 6 is a diagram illustrating an example of the signal detection circuit 91. The signal detection circuit 91 includes a comparator 130, a detection circuit 131, OR circuits 132, 135, a hysteresis comparator 133, and an AND circuit 134, detects the voltage Vfb_b at the terminal FB which receives the setting signal Sig, and detects the setting signal Sig based on the pulse width of the setting signal Sig.

The comparator 130 determines whether the voltage Vfb_b at the terminal FB is the ground voltage. Specifically, in response to determining that the voltage Vfb_b is lower than a reference voltage VREF1, the comparator 130 outputs a high signal Vsp. On the other hand, when the setting signal Sig is not received or the terminal FB is not short-circuited, the comparator 130 determines that the voltage Vfb_b is higher than the reference voltage VREF1, and outputs the low signal Vsp.

Here, the reference voltage VREF1 is a reference voltage for indicating whether the voltage Vfb_b is the ground voltage. The voltage Vfb_b reaches the ground voltage upon receipt of the setting signal Sig, and thus the pulse width of the signal Vsp results in being similar to the pulse width of the setting signal Sig.

In response to the signal Vsp going high, the OR circuit 132 outputs a high signal, and accordingly the OR circuit 135 outputs the high signal Vsb. Then, when the high signal Vsb is outputted, the driver circuit 90 outputs the low signal Vdr, resulting in stopping switching the NMOS transistor 76. Accordingly, when it is determined that the voltage Vfb_b is the ground voltage, the driver circuit 90 stops switching the NMOS transistor 76.

The detection circuit 131 detects the setting signal Sig, according to a time period during which the signal Vsp is high (for example, a time period during which it is determined that the voltage Vfb_b is the ground voltage). Specifically, the detection circuit 131 includes counters 141 to 143, SR flip-flops 144 to 146, and AND circuits 147, 148, detects the pulse width of the setting signal Sig in response to the count results C1 to C3 of the counters 141 to 143 having different numbers of counts, respectively, and detects the mode in which the driver circuit 90 operates. Note that the terminal FB corresponds to the "first terminal", and the comparator 130 corresponds to the "determination circuit".

Figure 7:
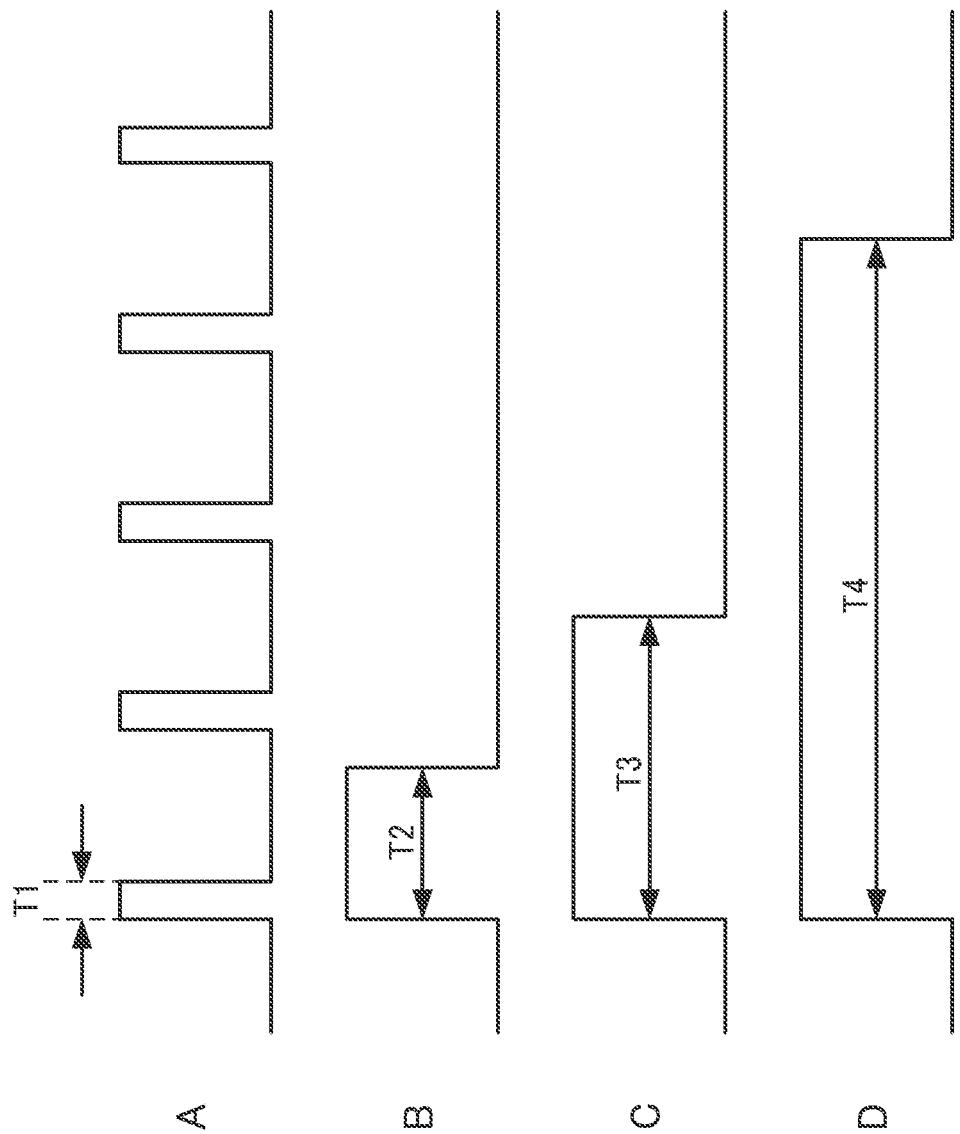
FIG. 7 is a diagram illustrating an example of pulse widths of setting signals Sig (signals Vsp) and a pulse width of the signal Vsp when a terminal FB is short-circuited.

FIG. 7 is a diagram illustrating an example of the pulse widths of the setting signals Sig, that is, the signals Vsp, and the pulse width of the signal Vsp when the terminal FB is short-circuited. Cases A to C indicate the setting signals Sig for setting the "stop mode", the "continuous mode", and the "burst mode" in the driver circuit 90, respectively. Case D indicates the signal Vsp when the terminal FB is short-circuited (here, referred to as a "short-circuit mode").

As illustrated in FIG. 7, in the case A, the setting signal Sig for the "stop mode" to stop the driver circuit 90 has a "pulse width T1". Then, in the case B, the setting signal Sig for operating the driver circuit 90 in the "continuous mode" has a "pulse width T2", and in the case C, the setting signal Sig for operating the driver circuit 90 in the "burst mode" has a "pulse width T3".

In the case D, in response to the pulse width of the signal Vsp becoming a "pulse width T4", which is longer than "T1", "T2", and "T3", the detection circuit 131 detects short-circuit at the terminal FB (that is, the "short-circuit mode"). Accordingly, the setting signal Sig has a pulse width that varies with the mode in which the driver circuit 90 operates, and a time period during which the terminal FB is in the short-circuited state is longer than time periods of the "pulse widths T1 to T3" which the setting signal Sig is capable of having.

Note that in order to detect the pulse widths "T1" to "T4", the counter 141 counts the "number of counts Count0" to count for a time period that is longer than "T1" and shorter than "T2". Similarly, the counter 142 counts the "number of counts Count1" to count for a time period that is longer than "T2" and shorter than "T3". Then, the counter 143 counts the "number of counts Count2" to count for a time period that is longer than "T3" and shorter than "T4". After counting the numbers of counts, the counters 141 to 143 output high signals C1 to C3, respectively.

FIG. 8 is a diagram illustrating a correspondence relationship between the pulse widths of the setting signals Sig and the logic level of each node in the detection circuit 131. Hereinafter, the cases A to D in which the pulse widths of the setting signals Sig are "T1" to "T4", respectively will be described with reference to FIG. 6 as well.

<Case A>

Upon receipt of the setting signal Sig having the "pulse width T1", the comparator 130 outputs the high signal Vsp, the counters 141 to 143 start counting, and the SR flip-flops 144 to 146 are reset and output low signals Q1 to Q3, respectively.

When the time period of the "pulse width T1" has elapsed since the receipt of the setting signal Sig, the counter 141 outputs the low signal C1, the counter 142 outputs the low signal C2, and the counter 143 outputs the low signal C3. At this time, the reset of the SR flip-flops 144 to 146 is released, and the SR flip-flops 144 to 146 output the signals Q1 to Q3 having the same logic levels as those of the signals C1 to C3, respectively. Accordingly, in this case, the signals Q1 to Q3 go low. As a result, the AND circuit 147 outputs a high signal S1, and the AND circuit 148 outputs a low signal S2. In response to the signals S1, S2, the OR circuit 135 outputs the high signal Vsb.

When the signal Vsb goes high based on the pulse width of the setting signal Sig, the driver circuit 90 outputs the low signal Vdr, to thereby stop the NMOS transistor 76. In other words, the driver circuit 90 operates in the "stop mode" based on the pulse width of the setting signal Sig.

<Case B>

Upon receipt of the setting signal Sig having the "pulse width T2", the signal Q1 goes high, the signals Q2, Q3 go low, the signal S1 goes low, the signal S2 goes low, and the signal Vsb goes low.

When the signal Vsb goes low, the driver circuit 90 outputs the driving signal Vdr to drive the NMOS transistor 76, and continuously switches the NMOS transistor 76. In other words, the driver circuit 90 operates in the "continuous mode" based on the pulse width of the setting signal Sig.

<Case C>

Upon receipt of the setting signal Sig having the "pulse width T3", the signals Q1, Q2 go high, and the signal Q3 goes low. The signal S1 goes low, and the signal S2 goes high. The signal Vsb becomes the same logic level as the logic level of a signal Vc2 outputted by the hysteresis comparator 133.

Here, when the voltage Vfb_b becomes higher than a high reference voltage VREF2, the hysteresis comparator 133 outputs the high signal Vc2 and causes the driver circuit 90 to stop the NMOS transistor 76. Thereafter, upon drop in the output voltage Vout1, the voltage Vfb_b thereby drops and becomes lower than a reference voltage VREF3, which is lower than the reference voltage VREF2, the hysteresis comparator 133 outputs the low signal Vc2 and causes the driver circuit 90 to switch the NMOS transistor 76.

In response to a change in the signal Vsb caused by a change in the voltage Vfb_b, the driver circuit 90 intermittently switches the NMOS transistor 76 in response to the signal Vsb. In other words, the driver circuit 90 operates in the "burst mode" based on the pulse width of the setting signal Sig.

<Case D>

When the terminal FB is in the short-circuited state during the time period of the "pulse width T4", the signal Vsp is high during the time period of the "pulse width T4". In this case, the signals Q1 to Q3 are high, and the signals S1, S2 are low.

As a result, the signal Vsb goes low. In addition, while the signal Vsp is high, the driver circuit 90 stops switching the NMOS transistor 76. In response to the signal Vsp going low and the driver circuit 90 being restored from the "short-circuit mode", the driver circuit 90 operates in the "continuous mode" regardless of the mode before the "short-circuit mode".

As described above, the signal detection circuit 91 detects the setting signal Sig based on the pulse widths "T1 to T3" of the setting signal Sig, and the driver circuit 90 drives the NMOS transistor 76 in response to the setting signal Sig detected by the signal detection circuit 91.

Note that the "continuous mode" corresponds to a "first mode", the "burst mode" corresponds to a "second mode", and the "stop mode" corresponds to a "third mode". In addition, the "pulse width T2" corresponds to a "first time period", the "pulse width T3" corresponds to a "second time period", and the "pulse width T1" corresponds to a "third time period". And, the output signal Vsb of the detection circuit 131 corresponds to a "result of detection". Moreover, the state in which the terminal FB is short-circuited corresponds to a "first state".

Note that although the stop mode, the burst mode, and the continuous mode are instructed by the control IC 40, the short-circuit mode occurs due to a failure in the power factor correction IC 75. Hence, in the power factor correction IC 75, detection needs to be performed separately for the stop mode and for the short-circuit mode. Switching to the stop mode in a pulse width shorter than that of the short-circuit mode makes it possible to restore the power factor correction IC to the continuous mode in a short time. Moreover, even when the DC-DC converter used together with the power factor correction IC 75 does not have a communication function as the control IC 40 have, switching can be safely stopped by virtue of the short-circuit mode.

Start-up Circuit 92

Referring back to FIG. 5, the start-up circuit 92 charges the capacitor 79 with the voltage at the terminal VH that receives the rectified voltage Vrec2, to generate the voltage Vcc. At the start-up, the start-up circuit 92 is turned on in response to the AC voltage Vac being applied to the power supply device 10, is turned off in response to the voltage Vcc reaching the predetermined level, and is again turned on in response to the voltage Vcc dropping from the predetermined level by a certain level. In addition, in response to the start-up of the DC-DC converter 12 being finished and the capacitor 52 being sufficiently charged with the current from the auxiliary coil L4, the start-up circuit 92 is turned off.

The terminal VCC receives the voltage Vcc for operating the power factor correction IC 75. The terminal VCC is coupled to the capacitor 79 having one end grounded. Hence, the capacitor 79 is charged with the current from the start-up circuit 92 or the DC-DC converter 12, the charge voltage of the capacitor 79 results in being the voltage Vcc for operating the power factor correction IC 75.

Note that the terminal VH corresponds to a "second terminal", and the voltage Vcc corresponds to a "power supply voltage". In addition, the capacitor 79 corresponds to an "external capacitor", and the power factor correction IC 75 corresponds to a "first integrated circuit".

Operation at Start-up of Power Supply Device 10

Figure 9:
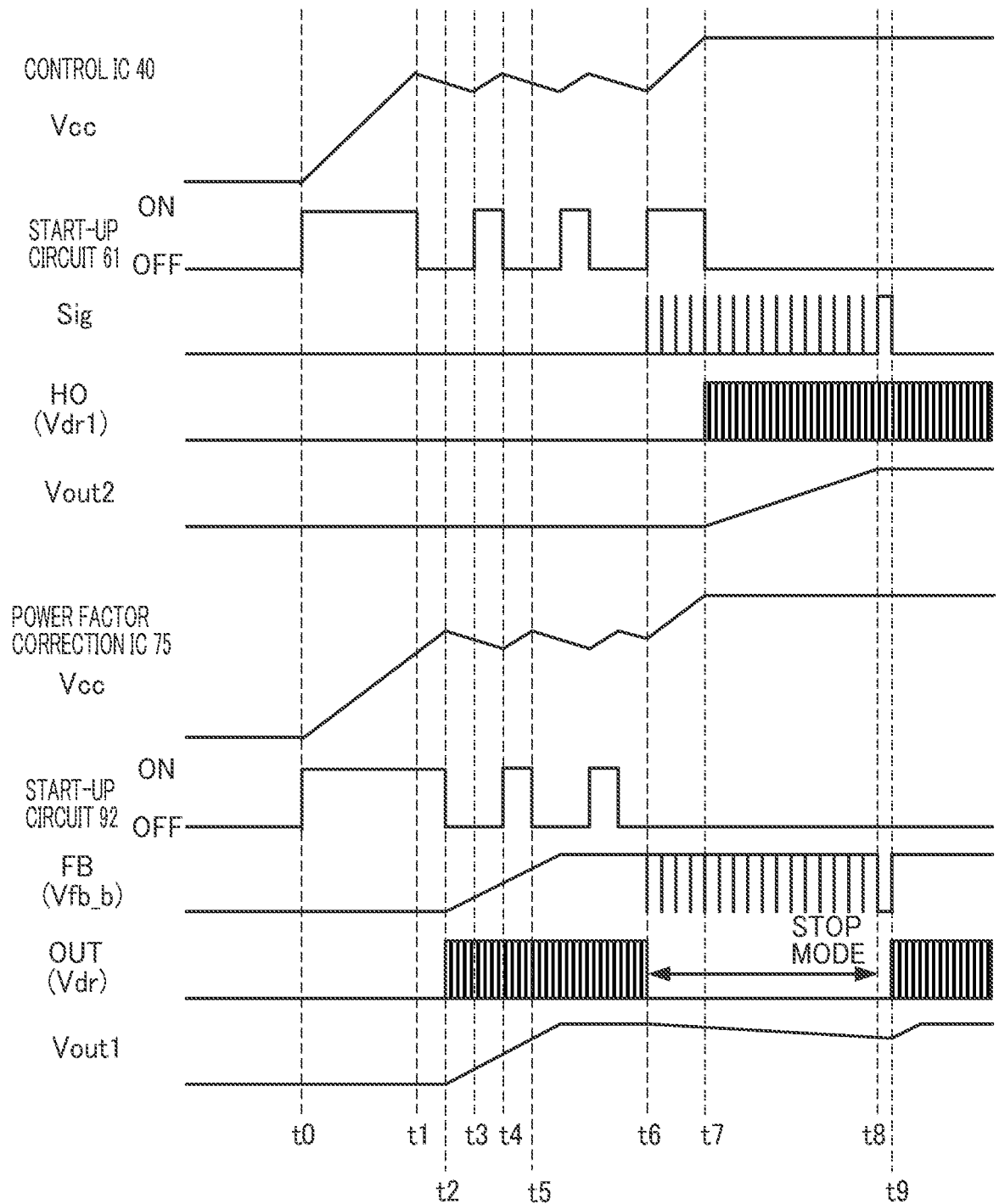
FIG. 9 is a diagram illustrating an example of major waveforms of ICs when a power supply device 10 starts up.

FIG. 9 is a diagram illustrating an example of major waveforms of the ICs when the power supply device 10 starts up.

It is assumed that the AC voltage Vac is not applied to the power supply device 10 before time t0. For this reason, neither the control IC 40 nor the power factor correction IC 75 is operating, and the output voltage Vout1 of the AC-DC converter 11 and the output voltage Vout2 of the DC-DC converter 12 are the ground voltage.

At time t0, when the AC voltage Vac is applied to the power supply device 10, the start-up circuit 61 of the control IC 40 and the start-up circuit 92 of the power factor correction IC 75 are turned on. As a result, the capacitors 52, 79 each are charged, and the voltage Vcc, which is the charge voltage of the capacitors 52, 79, rises.

At time t1, when the voltage Vcc on the control IC 40 side reaches the "predetermined level V1", the start-up circuit 61 is turned off, and the internal circuit of the control IC 40 operates to enable the control IC 40 to operate. Since the internal circuit operates, the voltage Vcc on the control IC 40 side drops.

At time t2, in response to the voltage Vcc on the power factor correction IC 75 side reaching the "predetermined level V2", at which the power factor correction IC 75 is operable, the start-up circuit 92 is turned off, and the power factor correction IC 75 outputs the driving signal Vdr from the terminal OUT. Upon switching of the NMOS transistor 76 in response to the driving signal Vdr, the output voltage Vout1 rises. In accordance therewith, the voltage Vfb_b at the terminal FB also rises.

In response to the voltage Vcc on the control IC 40 side dropping to the "predetermined level V3" at time t3, the start-up circuit 61 is turned on and charges the capacitor 52.

At time t4, in response to the voltage Vcc on the control IC 40 side rising to the "predetermined level V1", the start-up circuit 61 is turned off. Meanwhile, in response to the voltage Vcc on the power factor correction IC 75 side dropping to the "predetermined level V4", the start-up circuit 92 is turned on and charges the capacitor 79.

The same operation is repeated from time t5 to time t6.

At time t6, the state setting of the control IC 40 by the internal circuit is finished, and the start-up circuit 61 is turned on to raise the voltage Vcc prior to switching of the NMOS transistors 22, 23, and thus the voltage Vcc on the control IC 40 side rises. At this time, in order to avoid drop in the voltage Vcc due to the output of the driving signal Vdr of the power factor correction IC 75, the control IC 40 outputs, from the terminal STB, the setting signal Sig of a continuous pulse having the "pulse width T1" for stopping the driving signal Vdr.

Note that, at this time, the voltage Vcc on the power factor correction IC 75 side increases with an increase in the voltage Vcc on the control IC 40 side.

Upon receipt of the setting signal Sig of the continuous pulse having the "pulse width T1" from the terminal FB, the power factor correction IC 75 stops outputting the driving signal Vdr from the terminal OUT. This restrains a drop in the voltage Vcc caused by the power factor correction IC 75 operating, while the start-up circuit 61 is on to raise the voltage Vcc, and thus restrains the start-up circuit 61 from being turned on again.

At time t7, in response to charging of the voltage Vcc on the control IC 40 side being finished, the control IC 40 outputs the driving signal Vdr1 from the terminal HO. Although not illustrated, the control IC 40 also outputs the driving signal Vdr2 from the terminal LO. This starts switching of the NMOS transistors 22, 23, resulting in a rise in the output voltage Vout2. Note that, at this time, charging of the voltage Vcc on the power factor correction IC 75 side is also finished, with the charging of the voltage Vcc on the control IC 40 side being finished.

In response to the rise in the output voltage Vout2 of the DC-DC converter 12 begin finished at time t8, the control IC 40 outputs, from the terminal STB, the setting signal Sig having the "pulse width T2" for operating the power factor correction IC 75 in the "continuous mode". In response to the setting signal Sig being outputted, the voltage at the terminal FB of the power factor correction IC 75 reaching the ground voltage.

In response to the output of the setting signal Sig ending at time t9, at which the time period of the "pulse width T2" has elapsed since time t8, the voltage Vfb_b at the terminal FB of the power factor correction IC 75 becomes a feedback voltage according to the output voltage Vout1. Then, the power factor correction IC 75 outputs the driving signal Vdr from the terminal OUT, to switch the NMOS transistor 76.

Operation When Transitioning Between "Continuous Mode" and "Burst Mode"

Figure 10:
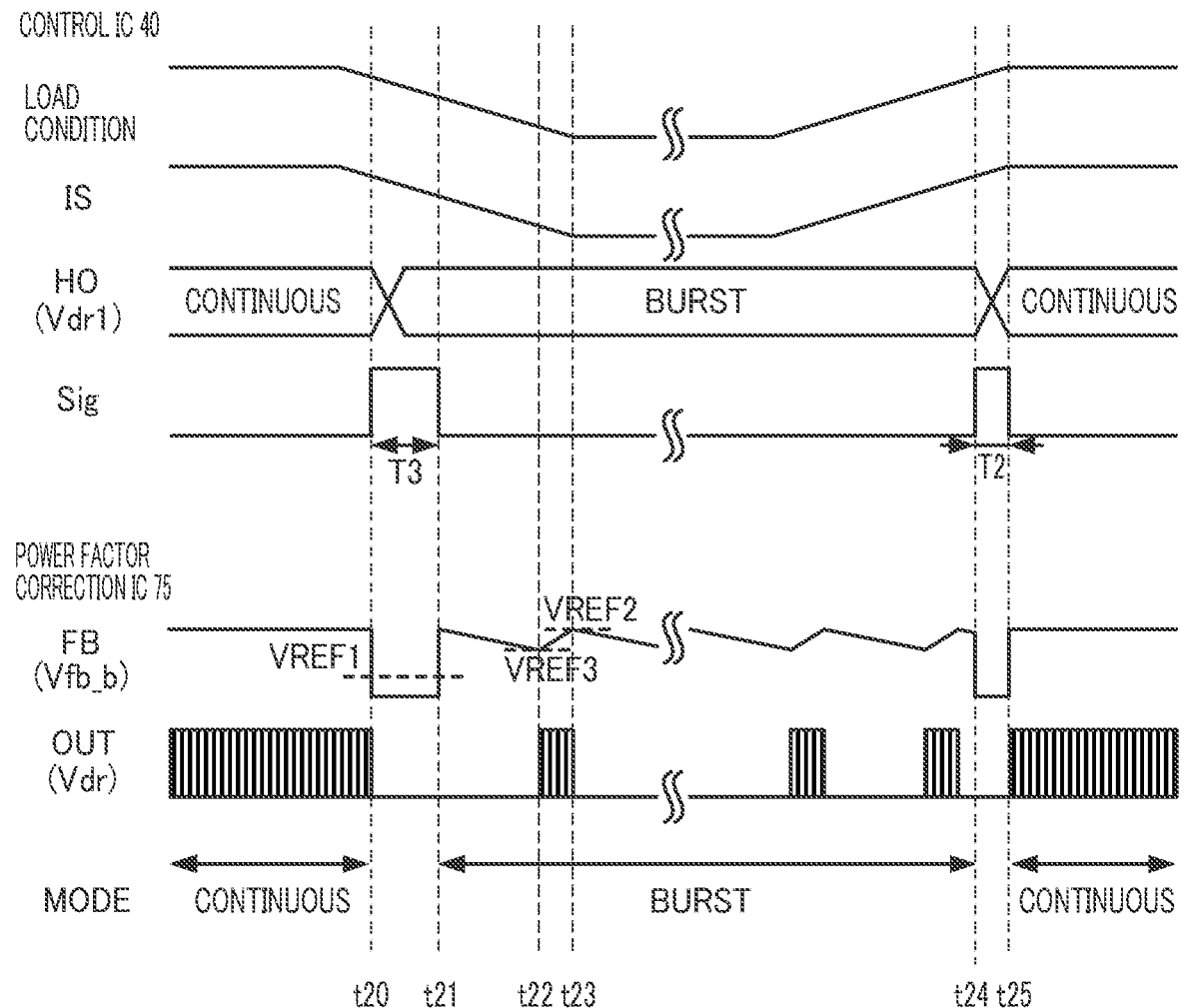
FIG. 10 is a diagram illustrating an example of major waveforms of ICs when transitioning between a "continuous mode" and a "burst mode".

FIG. 10 is a diagram illustrating an example of major waveforms of the ICs when transitioning between the "continuous mode" and the "burst mode". FIG. 10 illustrates change in output from the terminal OUT of the power factor correction IC 75 for driving the NMOS transistor 76, when transitioning from the "continuous mode" to the "burst mode", and transitioning from the "burst mode" to the "continuous mode".

It is assumed that the power supply device 10 has been started up before time t20, the load 13 is under heavy load condition, and the control IC 40 and the power factor correction IC 75 operate in the "continuous mode".

In response to the load 13 becoming under light load condition at time t20, the control IC 40 starts operating in the "burst mode", and the control IC 40 outputs the setting signal Sig having the "pulse width T3" from the terminal STB. In response to the setting signal Sig being outputted, the voltage at the terminal FB of the power factor correction IC 75 reaches the ground voltage, and the power factor correction IC 75 causes the logic level of the terminal OUT to be low, and stops switching the NMOS transistor 76.

At time t21, at which the time period of the "pulse width T3" has elapsed since time t20, the control IC 40 ends the output of the setting signal Sig. In response to the output of the setting signal Sig being ended, the voltage Vfb_b at the terminal FB of the power factor correction IC 75 becomes the feedback voltage according to the output voltage Vout1, and the power factor correction IC 75 operates in the "burst mode".

In response to the voltage level of the output voltage Vout1 dropping and the voltage Vfb_b dropping below the reference voltage VREF3 of the hysteresis comparator 133 at time t22, the power factor correction IC 75 outputs the driving signal Vdr from the terminal OUT to switch the NMOS transistor 76.

At time t23, the output voltage Vout1 rises due to switching of the NMOS transistor 76, and in association therewith, the feedback voltage Vfb_b rises above the reference voltage VREF2 of the hysteresis comparator 133, at time t23, the power factor correction IC 75 causes the logic level of the terminal OUT to be low to stop switching the NMOS transistor 76.

From time t23 to time t24, the power factor correction IC 75 repeats the same operation and operates in the "burst mode".

In response to the load 13 becoming under heavy load condition at time t24, the control IC 40 starts operating in the "continuous mode", and the control IC 40 outputs the setting signal Sig having the "pulse width T2" from the terminal STB. In response to the setting signal Sig being outputted, the logic level of the terminal FB of the power factor correction IC 75 reaches the ground voltage, and the power factor correction IC 75 causes the voltage at the terminal OUT to be low, and stops switching the NMOS transistor.

At time t25, at which the time period of the "pulse width T2" has elapsed since time t24, the control IC 40 ends the output of the setting signal Sig. When the output of the setting signal Sig is ended, the voltage at the terminal FB becomes the feedback voltage Vfb_b, and the power factor correction IC 75 operates in the "continuous mode".

"Operation at Occurrence of Short-circuit Mode"

Figure 11:
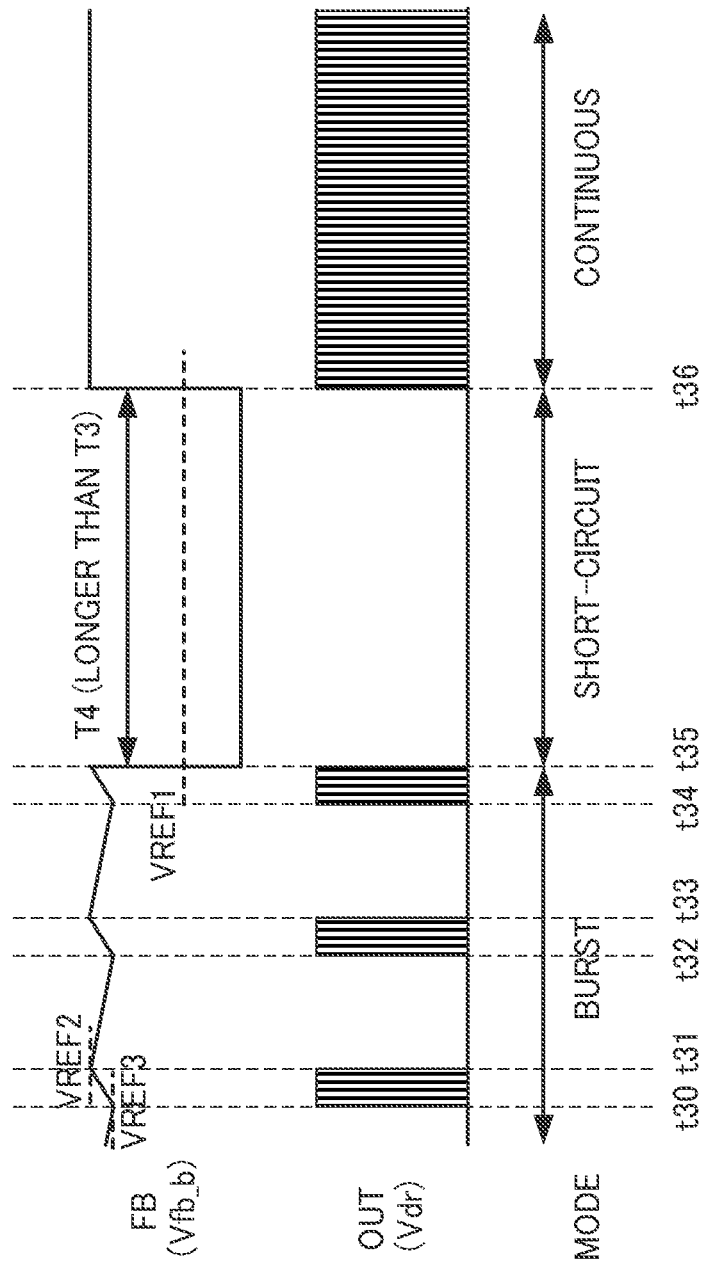
FIG. 11 is a diagram illustrating an example of major waveforms of ICs when transitioning to a "short-circuit mode".

FIG. 11 is a diagram illustrating an example of major waveforms of the ICs when transitioning to the "short-circuit mode".

At time t30, in response to the voltage level of the output voltage Vout1 dropping and the voltage Vfb_b dropping below the reference voltage VREF3 of the hysteresis comparator 133, the power factor correction IC 75 outputs the driving signal Vdr from the terminal OUT to switch the NMOS transistor 76.

At time t31, the output voltage Vout1 rises due to switching of the NMOS transistor 76, and in association therewith, the feedback voltage Vfb_b rises above the reference voltage VREF2 of the hysteresis comparator 133, the power factor correction IC 75 changes the logic level of the terminal OUT to be low, to stop switching the NMOS transistor 76.

From time t32 to time t35, the power factor correction IC 75 repeats the same operation as that from time t30 to time t32.

At time t35, in response to the power factor correction IC 75 detects the state in which the terminal FB is short-circuited, the power factor correction IC 75 enters the "short-circuit mode".

At time t36, in response to the power factor correction IC 75 is restored from the state in which the terminal FB is short-circuited, the power factor correction IC 75 operates in the "continuous mode" regardless of the mode prior to the "short-circuit mode".

===Summary===

(1) The power supply device 10 according to an embodiment of the present disclosure has been described above. The signal detection circuit 91 of the power factor correction IC 75 detects, through the terminal FB, the setting signal Sig outputted from the control IC 40 that operates based on the output voltage Vout1. In addition, the terminal FB receives the feedback voltage according to the output voltage Vout1. The setting signal Sig is detected through the terminal FB which receives the feedback voltage, thereby being able to detect the setting signal Sig without using a terminal dedicated to communications. In other words, it is possible to provide an integrated circuit capable of using a terminal that is used for a purpose other than communications with an externa circuit, as the terminal also used for communications therewith.

(2) In addition, the setting signal Sig has a pulse width "T1", "T2", "T3" that varies with the mode in which the driver circuit 90 operates, and thus the signal detection circuit 91 is capable of detecting the setting signal Sig, based on the pulse width with the use of the counter 141 and the like. Hence, the signal detection circuit 91 can implement various operation modes.

(3) In addition, with the power factor correction IC 75 implementing the "continuous mode" and the "burst mode", the power factor correction IC 75 operates in a mode based on the setting signal Sig corresponding to the condition of the load 13.

(4) In addition, at the start-up of the power supply device 10, the control IC 40 causes the power factor correction IC 75 to operate in the "stop mode", thereby optimizing the operation of the power supply device 10. Note that in a case where the control IC 40 includes a circuit that detects a drop in the output voltage Vout2 caused by the short-circuit of the load 13, the control IC 40 can also cause the power factor correction IC 75 to operate in the "stop mode" at the occurrence of the short-circuit of the load 13.

(5) In addition, the NMOS transistor 85 is provided outside the power factor correction IC 75 and coupled to the terminal FB thereof, thereby being able to detect the setting signal Sig based on a change in voltage at the terminal FB with a simple circuit.

(6) In addition, in response to turning on of the NMOS transistor 85, the voltage Vfb_b at the terminal FB changes to the ground voltage, thereby being able to easily detect the setting signal Sig.

(7) In addition, the signal detection circuit 91 includes the comparator 130, the detection circuit 131, and other circuits. This makes it possible to easily detect the setting signal Sig based on whether the logic level of the terminal FB reaches the ground voltage and the time period during which the voltage at the terminal FB is the ground voltage. Upon detection of the setting signal Sig, the driver circuit 90 stops switching the NMOS transistor 76. This makes it possible to restrain effects of a change in the voltage Vfb_b on the switching of the NMOS transistor 76. Thereafter, in response to the logic level of the terminal FB no longer being the ground voltage, an operation is performed in response to the setting signal Sig, thereby being able to achieve the cooperation between the control IC 40 and the power factor correction IC 75.

(8) In addition, in a case where the time period during which the logic level of the terminal FB is the ground voltage is longer than the pulse widths "T1" to "T3", which the setting signal Sig can have, the detection circuit 131 detects that the terminal FB is short-circuited, and in response to release of the short-circuited state, the power factor correction IC 75 operates in the "continuous mode" and is restored in a normal operation. This makes it possible for the power supply device 10 to perform a predetermined operation upon restoration from the short-circuit of the terminal FB.

(9) In addition, the terminal VH is provided to the power factor correction IC 75. Thus, even if a terminal dedicated to communications cannot be ensured, the terminal FB is used as the terminal for communications, thereby being able to achieve cooperation with the control IC 40 while allowing a reduction in size and multi-functionalization of the power factor correction IC 75.

(10) In addition, the signal detection circuit 91 is preferable to be used for allowing the control IC 40 and the power factor correction IC 75 to cooperate in the power supply device 10.

The present disclosure is directed to provision of an integrated circuit capable of using a terminal that is used for a purpose other than communications with an external circuit, as the terminal also used for communications therewith.

According to the present disclosure, it is possible to provide an integrated circuit capable of using a terminal that is used for a purpose other than communications with an external circuit, as the terminal also used for communications therewith.

An embodiment of the present disclosure described above is simply to facilitate understanding of the present disclosure and is not in any way to be construed as limiting the present disclosure. The present disclosure may variously be changed or altered without departing from its essential features and encompass equivalents thereof.

What is claimed is:

1. An integrated circuit for a power supply circuit that includes a transistor and generates an output voltage of a target level, the integrated circuit being configured to switch the transistor, the integrated circuit comprising:
   a first terminal configured to receive a voltage according to the output voltage;
   a signal detection circuit configured to detect, through the first terminal, a setting signal received from an external circuit that operates based on the output voltage; and
   a driver circuit configured to drive the transistor in response to the setting signal detected by the signal detection circuit, wherein
   the driver circuit is configured to operate in an operation mode,
   the setting signal has a pulse width that varies with the operation mode of the driver circuit, and
   the signal detection circuit detects the setting signal based on the pulse width of the setting signal.

2. The integrated circuit according to claim 1, wherein
   the operation mode includes a first mode and a second mode, and
   the driver circuit
      operates in the first mode for continuously switching the transistor, in response to the pulse width of the setting signal being a first time period, and
      operates in the second mode for intermittently switching the transistor, in response to the pulse width of the setting signal being a second time period.

3. The integrated circuit according to claim 2, wherein
   the operation mode further includes a third mode, and
   the driver circuit operates in the third mode for stopping switching the transistor, in response to the pulse width of the setting signal being a third time period.

4. The integrated circuit according to claim 2, wherein
   the power supply circuit further includes a switch configured to change the voltage at the first terminal in response to the setting signal,
   the first terminal is coupled to the switch, and
   the signal detection circuit detects the setting signal based on a change in the voltage at the first terminal in a time period of the pulse width.

5. The integrated circuit according to claim 4, wherein
   the switch changes the voltage at the first terminal such that the voltage at the first terminal is a ground voltage during the time period of the pulse width.

6. The integrated circuit according to claim 5, wherein
   the signal detection circuit includes:
      a determination circuit configured to determine whether the voltage at the first terminal is the ground voltage, and
      a detection circuit configured to detect the setting signal, according to a time period during which the voltage at the first terminal is the ground voltage; and
   the driver circuit
      stops switching the transistor in response to the determination circuit determining that the voltage at the first terminal is the ground voltage, and
      operates in the operation mode according to a result of detection of the detection circuit, in response to the determination circuit determining that the voltage at the first terminal is not the ground voltage.

7. The integrated circuit according to claim 6, wherein
   the detection circuit detects a first state, in response to the time period during which the voltage at the first terminal is the ground voltage being longer than a predefined time period, and
   the driver circuit operates in the first mode, in response to the determination circuit determining that the voltage at the first terminal is not the ground voltage, after the detection circuit detects the first state.

8. The integrated circuit according to claim 1, wherein
   the power supply circuit further includes:
      a rectifier circuit that rectifies an alternating-current (AC) voltage in the power supply circuit, and
      a capacitor external to the integrated circuit; and
   the integrated circuit further includes:
      a second terminal configured to receive a rectified voltage from the rectifier circuit, and
      a start-up circuit configured to charge the capacitor to generate a power supply voltage of the integrated circuit, based on the rectified voltage received at the second terminal.

9. A power supply device comprising:
   a power supply circuit including a transistor;
   a first integrated circuit configured to switch the transistor of the power supply circuit such that the power supply circuit generates an output voltage of a target level; and
   a second integrated circuit configured to operate based on the output voltage, wherein
   the second integrated circuit includes a setting-signal output circuit configured to output a setting signal to the first integrated circuit; and
   the first integrated circuit includes:
      a first terminal configured to receive a feedback voltage according to the output voltage,
      a signal detection circuit configured to detect, through the first terminal, the setting signal outputted from the second integrated circuit, and
      a driver circuit configured to drive the transistor in response to the setting signal detected by the signal detection circuit.

* * * * *